(12) United States Patent
Rothermel (10) Patent No.: US 8,797,681 B2
(45) Date of Patent: Aug. 5, 2014

(54) SERVO WRITE HEAD HAVING PLURAL SPACED FRONT BLOCKS COUPLED BY MAGNETIC POSTS TO A BACK BAR

(71) Applicant: Imation Corp., Oakdale, MN (US)

(72) Inventor: Stephen J. Rothermel, Roseville, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 13/795,590

(22) Filed: Mar. 12, 2013

(65) Prior Publication Data

US 2013/0286506 A1    Oct. 31, 2013

Related U.S. Application Data

(60) Provisional application No. 61/638,806, filed on Apr. 26, 2012.

(51) Int. Cl.
  *G11B 5/17*     (2006.01)
  *G11B 5/265*    (2006.01)
  *G11B 5/29*     (2006.01)

(52) U.S. Cl.
  USPC ...... 360/121; 360/75; 360/77.12; 360/123.17

(58) Field of Classification Search
  USPC .................. 360/75, 77.12, 121, 123.17, 129
  See application file for complete search history.

(56) References Cited

U.S. PATENT DOCUMENTS

| | | |
|---|---|---|
| 4,493,779 A | 1/1985 | Kamiyama |
| 4,493,874 A | 1/1985 | Kubo et al. |
| 4,672,009 A | 6/1987 | Takahashi |
| 4,690,768 A | 9/1987 | Kamiyama |
| 4,975,791 A | 12/1990 | Eggebeen |
| 5,132,860 A | 7/1992 | Von Stein |
| 5,247,397 A | 9/1993 | Sato et al. |
| 5,293,285 A | 3/1994 | Leonhardt et al. |
| 5,572,392 A | 11/1996 | Aboaf et al. |
| 5,689,384 A | 11/1997 | Albrecht et al. |

(Continued)

FOREIGN PATENT DOCUMENTS

| | | |
|---|---|---|
| GB | 812 023 A | 4/1959 |
| JP | 1208712 A | 8/1989 |
| JP | 2009-020943 A | 1/2009 |
| SU | 1631598 A1 | 2/1991 |

OTHER PUBLICATIONS

Kryder, Mark H. "An Introduction to Magnetic Recording Heads," in: Hadjipanayis, George C., ed., *Magnetic Storage Systems Beyond 2000*, NATO Science Series, vol. 41, Netherlands, Kluwer Academic Publishers, 2001, pp. 449-466.

(Continued)

*Primary Examiner* — Jefferson Evans
(74) *Attorney, Agent, or Firm* — Dorsey & Whitney LLP (57) ABSTRACT

An assembly comprises a plurality of laterally spaced front blocks, a magnetic post coupling each of the front blocks to a common back bar, and a common front bar magnetically coupled to the back bar. A write gap spacer is positioned between the front bar and each of the plurality of front blocks, and a write gap element comprising write gaps couples the front bar to each front block across the write gap spacer. A coil is configured to generate magnetic flux in each magnetic post, and the front blocks are configured to direct the magnetic flux across the write gaps.

20 Claims, 5 Drawing Sheets

(56) References Cited

U.S. PATENT DOCUMENTS

| | | | |
|---|---|---|---|
| 6,021,013 A | 2/2000 | Albrecht et al. | |
| 6,040,964 A | 3/2000 | Saliba | |
| 6,282,051 B1 | 8/2001 | Albrecht et al. | |
| 6,462,904 B1 | 10/2002 | Albrecht et al. | |
| 6,542,325 B1 | 4/2003 | Molstad et al. | |
| 6,647,613 B2 | 11/2003 | Beck et al. | |
| 6,781,778 B1 | 8/2004 | Molstad et al. | |
| 6,807,025 B1 | 10/2004 | Benakli et al. | |
| 6,822,827 B1 | 11/2004 | Heinz et al. | |
| 6,824,817 B2 | 11/2004 | Araki et al. | |
| 6,842,305 B2 | 1/2005 | Molstad et al. | |
| 6,943,987 B1 | 9/2005 | Raymond et al. | |
| 6,950,269 B1 | 9/2005 | Johnson | |
| 6,972,931 B2 | 12/2005 | Rudi et al. | |
| 7,002,763 B2 | 2/2006 | Bui et al. | |
| 7,012,774 B2 | 3/2006 | Nakao et al. | |
| 7,038,873 B2 | 5/2006 | Shimazaki et al. | |
| 7,050,251 B2 | 5/2006 | Lundstrom | |
| 7,054,101 B1 | 5/2006 | Marion et al. | |
| 7,072,133 B1 * | 7/2006 | Yip et al. | 360/53 |
| 7,132,164 B2 | 11/2006 | Yamazaki et al. | |
| 7,180,699 B1 | 2/2007 | Dee | |
| 7,190,551 B2 * | 3/2007 | Suda | 360/121 |
| 7,193,812 B2 * | 3/2007 | Eaton | 360/121 |
| 7,206,167 B2 | 4/2007 | Beck et al. | |
| 7,224,544 B2 | 5/2007 | Takano et al. | |
| 7,381,482 B2 | 6/2008 | Yamazaki et al. | |
| 7,436,622 B2 | 10/2008 | Johnson et al. | |
| 7,515,374 B2 | 4/2009 | Nakao | |
| 7,551,380 B2 | 6/2009 | Watson et al. | |
| 7,623,310 B2 | 11/2009 | Nakao | |
| 7,736,769 B2 | 6/2010 | Ajan | |
| 7,864,487 B2 * | 1/2011 | Cherubini et al. | 360/77.12 |
| 7,986,485 B2 | 7/2011 | Mckinstry et al. | |
| 8,014,100 B2 | 9/2011 | Biskeborn et al. | |
| 8,228,637 B2 | 7/2012 | Schaefer et al. | |
| 8,254,052 B2 | 8/2012 | Dugas | |
| 8,310,780 B2 | 11/2012 | Imaino et al. | |
| 8,670,203 B2 | 3/2014 | Ohtsu et al. | |
| 2003/0017364 A1 | 1/2003 | Kikitsu et al. | |
| 2003/0095353 A1 | 5/2003 | Nakao | |
| 2003/0099059 A1 | 5/2003 | Nakao | |
| 2004/0080847 A1 | 4/2004 | Lundstrom | |
| 2005/0099718 A1 | 5/2005 | Takano et al. | |
| 2005/0122620 A1 * | 6/2005 | Suda | 360/125 |
| 2005/0254170 A1 | 11/2005 | Dugas et al. | |
| 2006/0126207 A1 | 6/2006 | Johnson et al. | |
| 2006/0177702 A1 | 8/2006 | Ajan | |
| 2007/0223126 A1 | 9/2007 | Olson et al. | |
| 2007/0230040 A1 * | 10/2007 | Dugas et al. | 360/121 |
| 2007/0231609 A1 | 10/2007 | Ajan et al. | |
| 2008/0024905 A1 | 1/2008 | Johnson et al. | |
| 2008/0030899 A1 | 2/2008 | Norton | |
| 2008/0049356 A1 | 2/2008 | Weber et al. | |
| 2008/0158721 A1 | 7/2008 | Bui et al. | |
| 2008/0304180 A1 | 12/2008 | Schaefer et al. | |
| 2009/0040643 A1 | 2/2009 | Weng et al. | |
| 2009/0046396 A1 | 2/2009 | Nagata et al. | |
| 2009/0080108 A1 | 3/2009 | Watson et al. | |
| 2009/0141393 A1 | 6/2009 | Vanderheyden et al. | |
| 2010/0002335 A1 * | 1/2010 | Dugas | 360/121 |
| 2010/0246057 A1 | 9/2010 | Mckinstry et al. | |
| 2011/0102116 A1 | 5/2011 | Biskeborn et al. | |
| 2011/0102936 A1 | 5/2011 | Sugiyama et al. | |
| 2011/0141604 A1 * | 6/2011 | Dugas et al. | 360/55 |
| 2011/0222187 A1 * | 9/2011 | Biskeborn | 360/121 |
| 2012/0019954 A1 | 1/2012 | Imaino et al. | |
| 2012/0050908 A1 | 3/2012 | Ohtsu et al. | |
| 2012/0050910 A1 | 3/2012 | Ohtsu et al. | |
| 2012/0194941 A1 | 8/2012 | Jubert | |
| 2012/0314318 A1 | 12/2012 | Olson et al. | |
| 2012/0314319 A1 | 12/2012 | Olson et al. | |
| 2012/0314320 A1 | 12/2012 | Olson et al. | |
| 2012/0314322 A1 | 12/2012 | Olson et al. | |
| 2013/0148235 A1 | 6/2013 | Ochi et al. | |
| 2013/0286504 A1 | 10/2013 | Rothermel et al. | |

OTHER PUBLICATIONS

Cherubini, Giovanni, et al. "29.5-Gb/in$^2$ Recording Areal Density on Barium Ferrite Tape," *IEEE Transactions on Magnetics*, vol. 47, No. 1, pp. 137-147, Jan. 2011.

International Search Report dated Apr. 25, 2013, for PCT Application No. PCT/US2013/023816 filed Jan. 30, 2013.

International Search Report dated Aug. 13, 2012, for PCT Application No. PCT/US2012/042094 filed Jun. 12, 2012.

U.S. Appl. No. 13/795,668, filed Mar. 12, 2013, entitled "Methods and System for Magnetic Media Servo Writing".

U.S. Appl. No. 13/795,482, filed Mar. 12, 2013, entitled "Tapered Pole Heads for Magnetic Media".

U.S. Appl. No. 13/795,421, filed Mar. 12, 2013, entitled "Systems and Methods for Processing Magnetic Media".

U.S. Appl. No. 13/754,078, filed Jan. 30, 2013, entitled "Perpendicular Pole Head for Servo Writing Magnetic Media".

\* cited by examiner

SERVO WRITE HEAD HAVING PLURAL SPACED FRONT BLOCKS COUPLED BY MAGNETIC POSTS TO A BACK BAR

RELATED U.S. APPLICATION DATA

This application claims priority to U.S. provisional Application No. 61/638,806, filed Apr. 26, 2012, and incorporated herein by reference.

The subject matter of this application is also related to that of the following applications, each of which is incorporated by reference in its entirety for all purposes: U.S. non-provisional application Ser. No. 13/795,482, entitled "TAPERED POLE HEADS FOR MAGNETIC MEDIA", filed on even date herewith, which claims priority to U.S. provisional Application No. 61/638,820, filed Apr. 26, 2012; U.S. non-provisional application Ser. No. 13/795,668, entitled "METHODS AND SYSTEMS FOR MAGNETIC MEDIA SERVO WRITING", filed on even date herewith, which claims priority to U.S. provisional Application No. 61/638,767, filed Apr. 26, 2012; U.S. non-provisional application Ser. No. 13/79421, entitled "SYSTEMS AND METHODS FOR PROCESSING MAGNETIC MEDIA", filed on even date herewith, which claims priority to U.S. provisional Application No. 61/638,832, filed Apr. 26, 2012; and U.S. non-provisional application Ser. No. 13/754,078, entitled "PERPENDICULAR POLE HEAD FOR SERVO WRITING MAGNETIC MEDIA", filed Jan. 30, 2013, which claims priority to U.S. provisional Application No. 61/620,199, filed Apr. 4, 2012.

BACKGROUND

Magnetic tape-based data storage systems provide secure, reliable, cost-efficient, and scalable solutions for information processing in business, industry, and government service applications. Cartridge-based magnetic tape systems combine efficiency and ease of use in regulated bulk storage environments, and are adaptable for use with online, nearline, offline, and offsite infrastructures to relay large datasets, ensure regulatory compliance, and safeguard critical information while lowering data storage costs and service time.

Magnetic tape storage media provide high data density and capacity, with adaptable performance criteria suitable for a wide range of backup, archiving, and portable data storage needs. As storage densities and access speeds increase, however, substantial engineering demands are made on the tape cartridge and servo system, which must provide precise speed control and head positioning in order to quickly, accurately, and reliably read and write data to and from the recording medium.

To provide precision head positioning, servo tracks are recorded onto the medium during the formatting or manufacturing process. The servo control system reads the servo patterns, and uses a time-based pattern conversion to determine head position based on the servo signal. Representative servo system technologies are described in the following U.S. patent documents, each of which is incorporated by reference herein: Molstad et al., U.S. Pat. No. 6,542,325, TIME-BASED SERVO FOR MAGNETIC STORAGE MEDIA, issued Apr. 1, 2003, and assigned to Imation Corp. of Oakdale, Minn.; Molstad et al., U.S. Pat. No. 6,781,778, TIME-BASED SECTORED SERVO DATA FORMAT, issued Aug. 24, 2004, and assigned to Imation Corp. of Oakdale, Minn.; and Johnson et al., U.S. Pat. No. 6,950,269, SYSTEM AND METHODS FOR USING SERVOPOSITIONING SIGNALS, issued Sep. 17, 2005, and assigned to Imation Corp. of Oakdale, Minn.

Overall read and write performance thus depends on the servo system capabilities, and specifically on servo head design. In particular, the servo head should be adaptable to read and write a variety of different servo patterns, with increased timing response for precise head positioning and increased read and write performance for a range of high density, high data rate magnetic storage systems.

SUMMARY

Exemplary embodiments of the present disclosure include magnetic head assemblies, magnetic heads, and magnetic head systems. Assembly embodiments may comprise a plurality of laterally spaced front blocks, magnetic posts coupling each front block to a back bar, which may be a common back bar, and a front bar, which may be a common front bar, magnetically coupled to the back bar. A write gap spacer may be positioned between the front bar and each of the front blocks, and a write gap element may couple the front bar to each front block across the write gap spacer. The write gap element may comprise write gaps, and a coil may be configured to generate magnetic flux in each magnetic post, such that the front blocks direct the magnetic flux across the write gaps of each write gap element.

Magnetic head embodiments may include a plurality of laterally spaced front blocks, where each front block is magnetically coupled to a write gap element having at least two write gaps. A plurality of vias may couple the front blocks to a common back bar, and a plurality of coils may generate magnetic flux in the vias, where the laterally spaced front blocks direct the flux across the write gap elements. A front bar may magnetically couple the common back bar to each of the write gap elements, forming a return path for the magnetic flux.

System embodiments may include a magnetic medium facing a magnetic head. The magnetic head may include pluralities of write gap elements and front blocks spaced laterally across the magnetic medium, where the front blocks are coupled to the write gap elements and each write gap element has at least two write gaps. A via may couple each of the front blocks to a common back bar, and a coil may be configured to generate magnetic flux in each via. The front bar may couple each of the front blocks to the common back bar, providing a return path for the magnetic flux.

DETAILED DESCRIPTION

Figure 1:
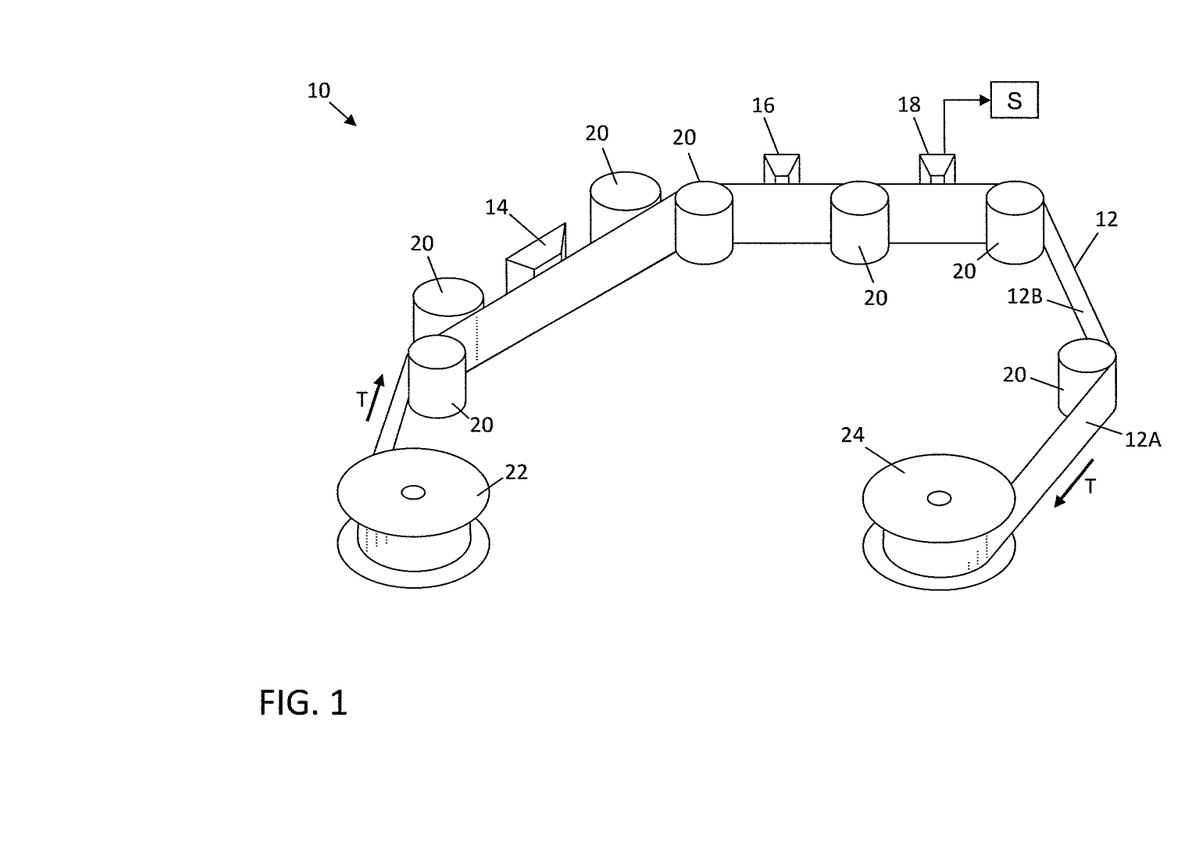
FIG. 1 is a schematic view of a servo write system for magnetic recording media.

FIG. 1 is a schematic view of system 10 for processing magnetic medium 12, for example a tape-based data storage medium 12 with magnetic recording layer or coating 12A on substrate 12B. In this particular example, system 10 includes erasure or formatting head 14, write head 16, read head 18, and one or more guides 20. Depending on application, system 10 may also include other components including, but not limited to, tension control devices, vacuum columns, polishing and cleaning elements, and additional magnetic heads or other components for further read, write, erase, and formatting operations on magnetic medium 12.

Tape guides or rollers 20 guide magnetic medium 12 through system 10 along media travel direction T (arrows), for example from supply reel 22 to take-up reel 24. Erase head 14 provides a particular magnetic domain orientation or bias along magnetic coating 12A of magnetic medium 12. Write head 16 provides improved magnetic field and flux guiding structures to write a servo pattern or other data onto magnetic medium 12, as described below. Read head 18 generates servo signal (or other read signal) S based on the data patterns generated by write head 16.

Magnetic medium 12 is typically formed by binding magnetic coating 12A to a substrate or base film 12B, for example a polymer such as polyethylene terephthalate (PET) or polyethylene naphthalate (PEN). Suitable magnetic coatings 12A include magnetic particles or a magnetic powder in a binder such as a thermoplastic resin, and may be configured for either longitudinal or perpendicular recording. Magnetic coating 12A may also include a head cleaning agent (HCA) such as alumina or aluminum oxide pigment particles, abrasive grains such as silica, or both, along with other resin or binder components such as surfactants, lubricants, and hardeners. Magnetic coating 12A may also include a hard magnetic film coating, such as one produced using an evaporation process, or produced using sputtering, or produced using another technique.

A back coat may be applied to substrate 12B, opposite magnetic coating 12A, for example silicon dioxide or carbon black pigment particles, or both, with a blend of polymer resin or nitrocellulose binders to provide stiffness, reduce friction, dissipate static charge, and maintain uniform tape wind. Alternatively, the orientation of magnetic coating 12A and back coat or substrate surface 12B may be reversed, or magnetic coatings may be provided on both surfaces 12A and 12B of magnetic medium 12. It should be recognized, moreover, that the present invention may also be used with any suitable type of tape or any suitable type of media, as desired, including, but not limited to, magnetic tapes and other digital data storage media, audio and video tapes, and other magnetic media configured for analog or digital recording.

Figure 2:
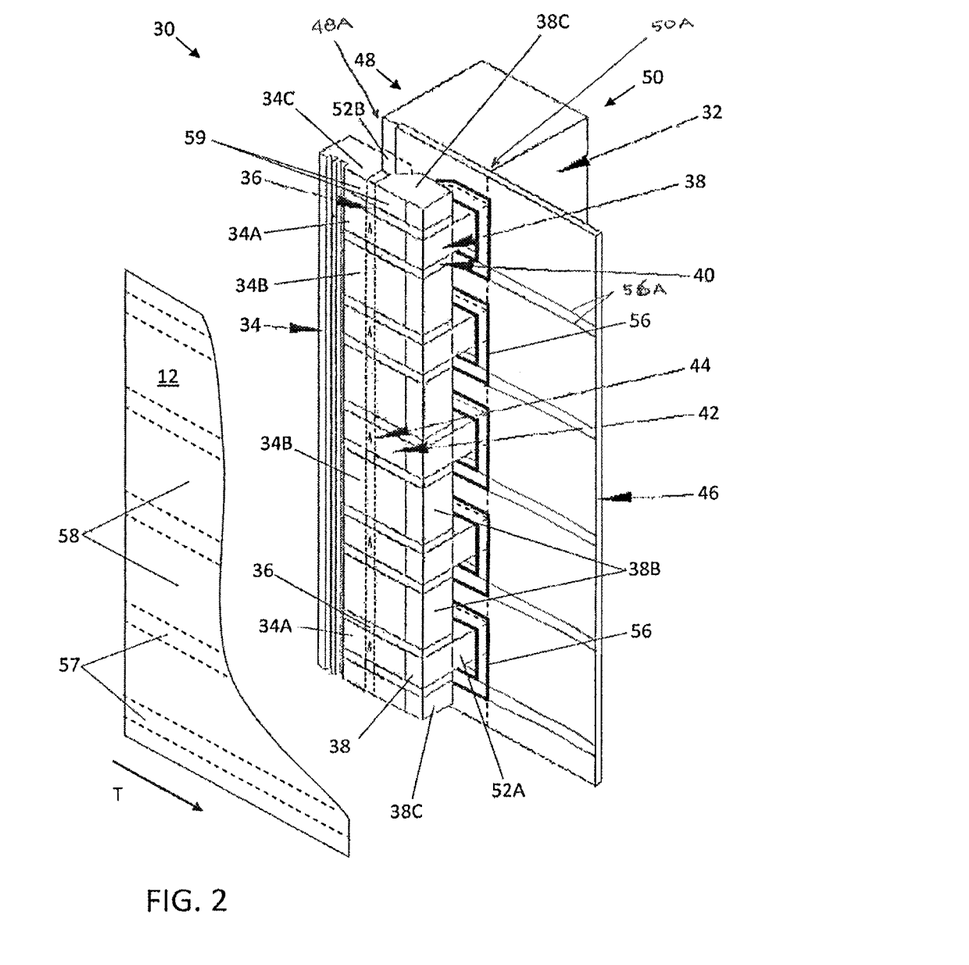
FIG. 2 is a perspective view of a magnetic head for the servo write system.

FIG. 2 is a perspective view of magnetic head assembly 30, for example servo write head 16 of processing system 10, as described above, or another write head 30 for generating data patterns on magnetic medium 12. In this particular example, magnetic head 30 assembly includes back bar 32, front bar 34, write gap spacers 36, front blocks 38, block spacers 40, write gap elements 42 with gap structures 44, and coil component 46.

Leading and trailing portions 48 and 50 of magnetic head assembly (or magnetic head) 30 are defined with respect to media travel direction T of the magnetic medium (arrow). Depending on application, media travel direction T may also be reversed, without loss of generality. Leading portion 48 may include leading edge 48A, that is, a part of leading portion 48 that contacts the magnetic medium 12. Similarly, trailing portion 50 may include trailing edge 50A, that is, a part of trailing portion 50 that contacts the magnetic medium 12.

Back bar or back core 32 is generally formed of a soft magnetic material to create a flux return path for directing magnetic flux through head 30. Suitable materials for common back bar 32 include high permeability, low coercivity, high saturation magnetic materials, for example ferromagnetic alloys and ferrite materials including, but not limited to, manganese zinc ferrite and nickel zinc ferrite. As shown in FIG. 2, back bar 32 may also be formed as a common magnetic core or back bar element, in a substantially unitary form with magnetic couplings to front bar 34 along leading portion 48 and leading edge 48A of magnetic head 30, and to each of front blocks 38 along trailing portion 50 and trailing edge 50A of magnetic head 30.

The magnetic couplings between back bar 32 and front blocks 38 are formed by magnetic posts or vias 52A. Magnetic posts 52A are typically formed of a soft magnetic core material, for example a material similar to or substantially the same as that of back bar 32 and/or front blocks 38. One or more magnetic posts 52A may thus be formed as an integral or unitary structure with back bar 32, or with one or more front blocks 38. Alternatively, one or more magnetic posts 52A may be formed as a separate magnetic element, with magnetic couplings to back bar 32 and front blocks 38 at opposite ends.

Front bar or front core 34 may be formed of substantially the same or similar materials (e.g., soft magnetic core materials) as back bar 32 and/or posts 52A, or other suitable magnetic materials. As shown in FIG. 2, front bar 34 may also be configured as a common or substantially unitary magnetic core element, with couplings to common back bar 32 via magnetic posts 52B, and with integrated front bar pole or core portions 34A for coupling to each of front blocks 38, across write gap spacers 36.

In a preferred embodiment, the gap structures 44 are formed in a very high saturation flux density high permeability magnetic film 42. The magnetic film 42 may be composed of Fe—Ta—N, Fe—Al—N, Fe—Ni—N, Fe—N, Co—Fe, Co—Zr—Ta, Al—Fe—Si, Fe—Ni, other materials, or mixtures of these.

Magnetic posts 52B are formed of substantially the same or similar materials as those of magnetic posts 52A, back bar 32, and front bar 34. Thus, magnetic posts 52B may be formed integrally or as a unitary structure with back bar 32, front bar 34, or both. Alternatively, one or more magnetic posts 52B may be formed as discrete magnetic structures, coupling to back bar 32 and front bar 34 at opposite ends. Similarly, front bar cores 34A may be integrally formed as a unitary structure with a common front bar 34, or configured as separate magnetic elements with individual magnetic couplings to front bar 34, opposite write gap spacers 36.

Write gap spacers (or gap spacers) 36 are typically formed of a non-magnetic material, such as silica or silica-based glass, or another ceramic or nonmagnetic metal material. Write gap elements 42 couple front bar cores 34A to front blocks 38, across write gap spacers 36.

One or more coils 56 are positioned about magnetic posts 52A in order to generate magnetic flux. Coils 56 are formed of a conducting material such as copper, for example in the form of a thin film or flex circuit coil component 46. Coils 56 can be coupled to leads 56A, which can be coupled to an electronic circuit or another energy source.

In one embodiment, coils 56 and leads 56A can be disposed on a flexible coil component 46, as shown in the figure. In first alternative embodiments, coils 56 and leads 56A may be disposed on a flexible coil component 46 having multiple layers with appropriate vias to reduce current and increase inductance. In second alternative embodiments, coils 56 may be disposed on the flexible coil component 46 with a relatively larger portion of one or more coils 56 to a side of magnetic posts 52A or 52B or both, with the effect of providing relatively improved heat dissipation. In third alternative embodiments, coils 56 may include one or more formed wire coils disposed on the flexible coil component 46. In fourth alternative embodiments, coils 56 may be disposed around magnetic posts 52A or 52B or both, on opposite sides of the magnetic head 30, with the effect of providing relatively improved heat dissipation and relatively reduced coupling.

Coils 56 are energized with electric current, such as using leads 56A, to generate magnetic flux in magnetic posts 52A and front blocks 38. Front blocks 38 direct the flux across write gap spacers 36 through write gap elements 42, in order to write servo patterns or other data to magnetic medium 12 at write gap structures 44. Front bar cores 34A direct the flux from write gap elements 42 to common front bar 34, which is coupled to common back bar 32 to provide a flux return path.

In discrete coil configurations, individual coils 56 are separately controllable to write different data patterns across each write gap structure 44. Alternatively, one or more coils 56 may be energized in a coordinated fashion, or replaced with a common coil component 46 positioned about two or more magnetic posts 52A or front blocks 38, in order to generate similar or substantially the same data patterns across two or more write gap structures 44.

Intermediate blocks 38B are laterally spaced between front blocks 38 by block spacers 40. End blocks 38C are provided at the sides or opposite lateral ends (e.g., top and bottom) of magnetic head 30, with additional block spacers 40 to space end blocks 38C from adjacent front blocks 38 along the opposite lateral edges of back bar 32 and front bar 34.

Front bar cores 34B, intermediate blocks 38B, end cores 34C, and end blocks 38C are formed of soft magnetic core materials, as described above, in order to direct and contain magnetic flux. Intermediate blocks 38B are coupled to front bar 34 via intermediate cores 34B, and end blocks 38C are coupled to front bar 34 via end cores 34C. Along trailing edge portion 50, intermediate blocks 38B and end blocks 38C may be spaced from magnetic posts or vias 52A across block spacers 40, so that intermediate cores 34B and intermediate blocks 38B are substantially decoupled from back bar 32 and substantially decoupled from coils 56.

Thus, intermediate blocks 38B and intermediate poles 34B function as shield elements, in order to prevent stray magnetic flux from magnetizing the data bands between adjacent pairs of front blocks 38. End blocks 38C and end cores 34C may perform similar shielding functions along the top and bottom edges of magnetic medium 12.

In operation of magnetic head 30, magnetic medium 12 tracks past magnetic head 30 at a particular fly height, or in (direct) head-medium contact, with relative motion along media travel direction T. Coils 56 are energized to generate magnetic flux through posts 52A and front blocks 38, and magnetic head 30 writes servo tracks or other data onto magnetic medium 12 by directing the magnetic flux across write gap structures 44 in write gap elements 42.

As shown in FIG. 2, for example, five thin film write gap elements 42 are laterally spaced across magnetic head 30, and positioned across write gap spacer 36 to couple five similarly spaced front blocks 38 to one or more front bar cores 34A in common front bar 34. Front blocks 38 and write gap structures 44 thus define five servo track regions or servo bands 57 along magnetic medium 12, alternating with four data bands 58. Data bands 58 are defined by four laterally spaced intermediate (shield) blocks 38B and intermediate (shield) cores 34B, so that data bands 58 extend along magnetic medium 12 between adjacent pairs of servo bands 57.

Depending on manufacturing process and application, write gap spacer 36 may also extend across one or more of intermediate blocks (or shields) 38B and end blocks 38C, with coupling across write gap spacer 36 provided by additional thin film or other magnetic elements 59, as shown in FIG. 2. Magnetic shield elements 59 are typically formed without write gap structures 44, in order to provide additional magnetic shielding, and to prevent stray flux from biasing the magnetic coating in the data and side bands. In one embodiment, magnetic shield elements 59 include the same or similar material as write gap elements 42. In the figure, although there are multiple magnetic shield elements 59 shown, there is one write gap spacer 36 that extends across substantially the entire common front bar 34. Write gap structures 44 in magnetic shield elements 59 covering front blocks 38 allow writing patterns to servo bands 57, while the lack of write gap structures 44 in magnetic shield elements 59 covering intermediate blocks 38B and end blocks 38C prevent writing patterns to data bands 58. Alternatively, one or more intermediate blocks 38B or end blocks 38C may be coupled to a coil 56, and additional write gap structures 44 may be provided to write data patterns onto data tracks or side bands of magnetic medium 12.

This particular configuration is thus merely representative. In other examples, magnetic head 30 can be configured with any number of front blocks 38 and write gap structures 44 to generate five (or, in alternative embodiments, some other number) servo bands 57. Alternatively, magnetic head 30 may be configured with additional write gap structures 44 to write data patterns onto any combination of servo bands 57, data bands 58 and additional side bands, as described above. Further, the individual servo and data patterns may also take on any desired form, some of which are described below.

Figure 3:
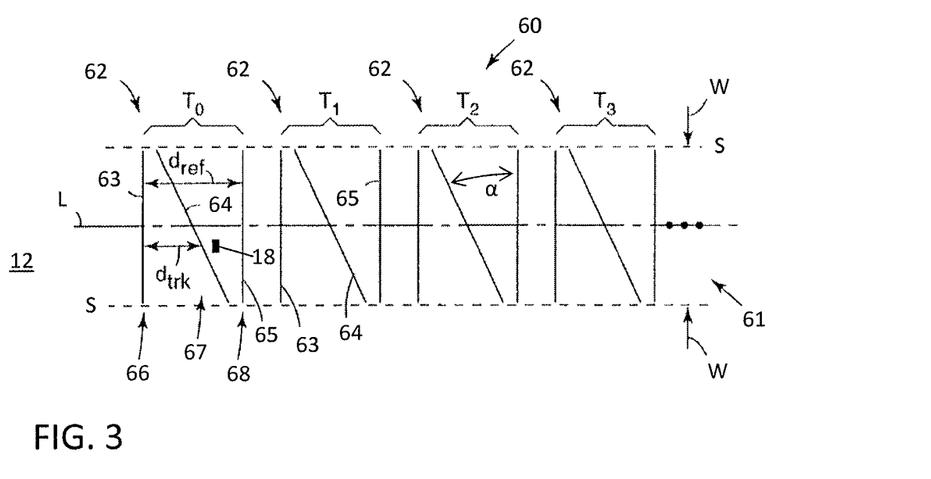
FIG. 3 is schematic illustration of a servo pattern on a magnetic recording medium.

FIG. 3 is schematic illustration of servo or data pattern 60 as defined along on servo band 61 of magnetic recording medium 12. Magnetic recording medium 12 is shown in a top-down view, with the magnetic coating or recording surface on either the front or back side of magnetic medium 12.

In the particular example of FIG. 3, data pattern 60 is represented by a series of similar or substantially identical sets of pattern lines 63, 64, and 65, forming N-shaped servo frames 62 along centerline L of servo band 61. Width W of pattern 60 is defined generally perpendicularly to center line L, between lateral edges or sides S or pattern lines 63, 64, and 65.

Data pattern 60 may extend continuously along substantially the entire length of magnetic medium 12, or be formed in particular sectors, for example at the beginning and end of magnetic medium 12, or in periodic locations along magnetic medium 12. Data pattern 60 may also represent either a servo pattern or more generalized data, for example generic binary data written to a data band.

In formatting applications, servo or data frames 62 may be written to magnetic medium 12 during a manufacturing, formatting or reformatting process, for use as a reference to position the data heads during read and write operations on data tracks located between the servo bands. For example, individual frames 62 may be written at times $t_0$, $t_1$, $t_2$, etc., as shown in FIG. 3, with substantially perpendicular pattern lines 63 and 65 in reference regions 66 and 68. Diagonal pattern line 64 extends across servo region 67 at skew angle α, forming an N-shaped pattern ("|\|") in each frame 62.

Servo signal timing depends on the relative position of pattern lines 63, 64, and 65. As magnetic medium 12 translates along center line L, read head 18 generates a corresponding series of servo transition signals, or read pulses. Based on the signal timing, perpendicular (or parallel) pattern lines 63 and 65 define reference distance $d_{ref}$, which is relatively constant across width W of data pattern 60, and diagonal (or skew) pattern line 64 defines tracking distance $d_{trk}$, which varies across width W. (While a relatively constant reference distance $d_{ref}$ can be preferred in many embodiments, in the context of the invention there is no particular requirement for any such limitation.) The time intervals can thus be used to generate a position signal corresponding to the location of read head 18, based on the ratio $d_{trk}/d_{ref}$. The servo signals are used to position read and write heads along particular data tracks, as defined between the servo bands.

Although lines 63, 64, and 65 are shown as individual pattern lines, in a preferred embodiment, each line can be recorded multiple times in parallel in each frame, such as about four or five or some other number of times. This has the effect that line 63, recorded as four or five (or some other number) of lines, can be more easily recognized than a single line. Similarly, lines 64 and 65 can be recorded multiple times in parallel in each frame, with the effect that lines 64 and 65, recorded as four for five (or some other number) of lines, can be more easily recognized than a single line.

In one embodiment, current is pulsed alternately in four pulse bursts or five pulse bursts. The pulse bursts are completed such that four or five pattern lines 63 are recorded on the magnetic medium 12 in less space than the distance between pattern lines 63 and pattern lines 64. Similarly, the pulse bursts are completed such that four or five pattern lines 64 and 65 are recorded on the magnetic medium 12 in less space than the distance between pattern lines 63 and 65 (for pattern lines 64) or between pattern lines 64 and the next data pattern 60 (for pattern lines 65). The pulse bursts to generate the next data pattern 60 occur only after the magnetic medium 12 has moved sufficiently that pattern lines 65 and 63 do not overlap.

In particular, the ratio $d_{trk}/d_{ref}$ depends on skew angle α. Angle α may range from at least about 2 degrees to about 10 degrees or more, for example about 2-10 degrees, or about 6 degrees, within a tolerance of about ±0.5 degree or about ±0.1 degree, or between about 5 degrees and about 7 degrees. Alternatively, angle α may range above about 10 degrees, for example about 10-20 degrees, or greater than about 20 degrees. Frames 62 may also be reversed, forming a "|/|" or "inverted N" servo frame. Other servo and data patterns 60 may also be generated with different data frames 62, as described below.

Figure 4:
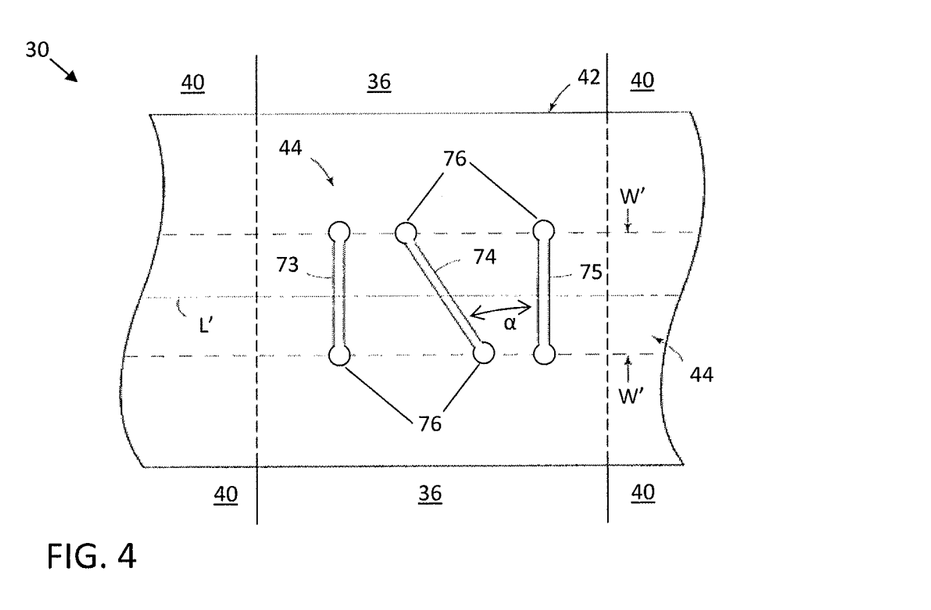
FIG. 4 is a front surface view of a gap structure for writing the servo pattern.

FIG. 4 is a front or media-facing surface view of write gap element 42 for magnetic head 30, with write gap structure 44. In this particular example, write gap structure 44 has three individual write gaps 73, 74, and 75, corresponding to an N-shaped servo data pattern 60, as shown in FIG. 3.

Write gap element 42 may be formed of a thin sheet or thin film of magnetically permeable material with high saturation flux density and low coercivity, in order to guide magnetic flux across write gap spacer 36 to write gaps 73, 74, and 75. Suitable materials for write gap element 42 include, but are not limited to, Fe—Ni, Co—Zr—Ta, Fe—Ni—N, Fe—Ta—N, Fe—Al—N, Fe—Si—N, and Co—Fe.

Write gaps 73, 74, and 75 may have a substantially symmetric configuration about center line L' of write gap structure 44, with write gap width W' corresponding to width W across centerline L of servo data pattern 60. Write gap 74 may also be formed at angle α with respect to generally parallel or perpendicular write gaps 73 and 75, in order to write a diagonal or skew servo line between parallel reference lines, as described above.

To increase field strength across the full width W of write gap structure 44, end features 76 may be provided at the lateral (top and bottom) edges of one or more write gaps 73, 74, and 75. End features 76 may have a different shape, including a generally circular geometry, as shown in FIG. 4, in order to increase the width of write gaps 73, 74, and 75, and to generate more uniform field strength across width W of write gap structure 44. Alternatively, end features 76 may have an oblate, elliptical, square, rectangular or diamond-shaped geometry, or another shape or geometry suitable for increasing field strength and servo pattern uniformity.

Figure 5A:
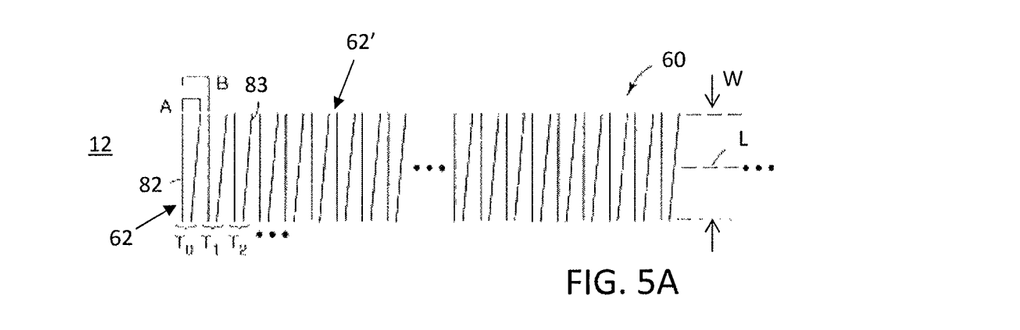
FIG. 5A is a schematic illustration of an alternate servo pattern for the recording medium.

FIG. 5A is a schematic view of an alternate servo data pattern 60 for magnetic medium 12. In this example, individual frames 62 of servo data pattern 60 are formed as an alternating series of transverse or perpendicular pattern lines 82 and diagonal or skew pattern lines 83. Alternatively, frames 62' may be defined by alternating pairs of diagonal pattern lines 83, followed by transverse pattern lines 82.

Servo or data frames 62 are written to magnetic medium 12 by forming pairs of pattern lines or stripes 82 and 83 at times $T_0$, $T_1$, $T_2$, etc., as described above. As shown in FIG. 5A, pattern lines 82 and 83 are substantially symmetric across centerline L, defining a servo read signal or positioning signal based on the magnetic field transitions at the beginnings and ends of transverse pattern line 82 and diagonal pattern line 83.

The transition times define distance A between different pattern lines 82 and 83, where distance A varies across width W of servo data pattern 60. Distance B, however, is substantially constant, as defined between pairs of the same pattern lines 82, 82 (or 83, 83). The transverse position of the read head is thus determined by the ratio A/B, similar to the corresponding ratio of tracking and reference distances $d_{trk}$ and $d_{ref}$, as described above.

Figure 5B:
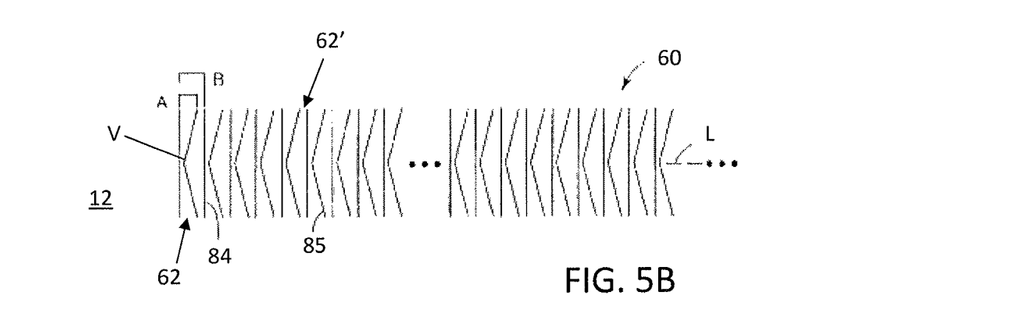
FIG. 5B is a schematic illustration of a second alternate servo pattern for the recording medium.

FIG. 5B is a schematic view of a second alternate servo data pattern 60 for magnetic medium 12. In this example, individual frames 62 each include a transverse pattern line 84, followed by a chevron-shaped pattern line 85. Alternate frames 62' have chevron pattern line 85 followed by transverse pattern line 84.

Chevron pattern lines 85 have two legs meeting at a cusp or vertex V, for example with vertices V aligned along centerline L of servo data pattern 60, as shown in FIG. 5B. Pattern lines 84 and 85 define magnetic transitions corresponding to variable distance A and fixed (reference) width B, as described above, with head positioning determined by the ratio A/B.

Figure 5C:
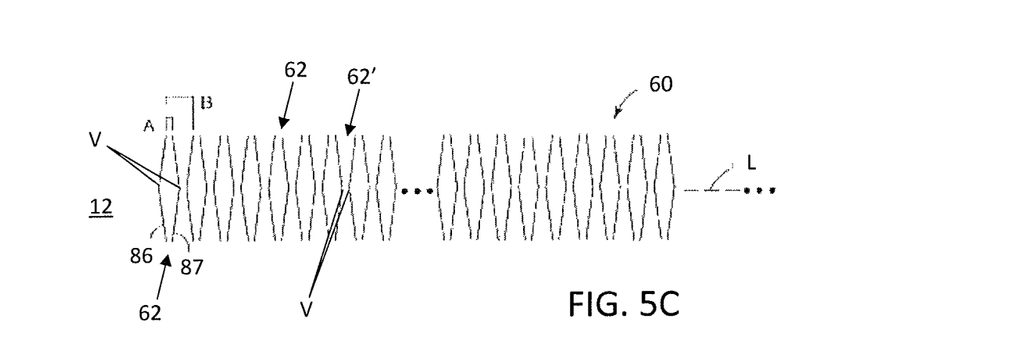
FIG. 5C is a schematic illustration of a third alternate servo pattern for the recording medium.

FIG. 5C is a schematic view of a third alternate servo data pattern 60 for magnetic medium 12. As shown in FIG. 5C, servo or data frames 62 are formed of two chevron pattern lines 86 and 87, with opposing vertices V aligned in an outward sense along centerline L of servo data pattern 60. Alternatively, frames 62' are defined by chevron pattern lines 87 and 86, with vertices V aligned in an inward sense along centerline L.

Figure 6A:
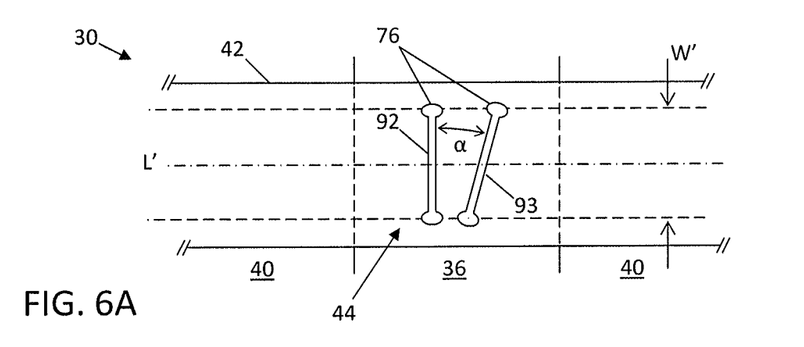
FIG. 6A is a front surface view of an alternate thin film structure for the magnetic head.

FIG. 6A is a schematic view of write gap element 42 for magnetic head 30, with an alternate configuration for write gap structure 44. In this particular example, write gap structure 44 includes a first (transverse) write gap 92 and a second (diagonal or skew) write gap 93. Write gap 92 makes angle α with respect to write gap 93, for example to generate pattern lines 82 and 83 for servo data pattern 60 of FIG. 5A, as described above.

As shown in FIG. 6A, end features 76 are formed as oblate or elliptical features, with geometry selected to improve field strength at the ends of write gaps 92 and 93, and to increase pattern uniformity across width W' of write gap structure 44. Alternatively, end features 76 are formed with circular, rectangular or diamond-shaped geometry, or another suitable geometry for increasing the uniformity of the servo pattern. In addition, write gaps 92 and 93 may be reversed, in order to generate a complementary servo data pattern with reversed perpendicular and skew lines.

Figure 6B:
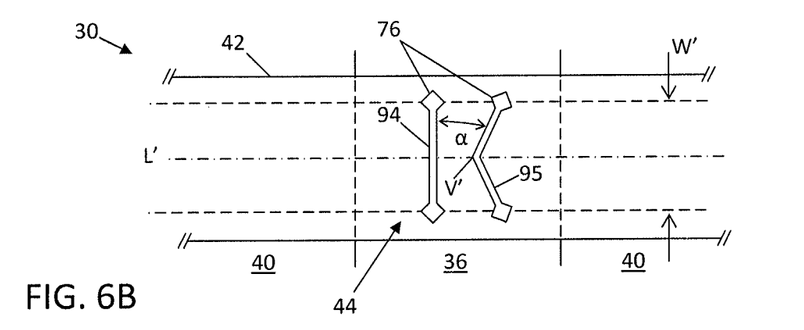
FIG. 6B is a front surface view of a second alternate thin film structure for the magnetic head.

FIG. 6B is a schematic view of write gap element 42 for magnetic head 30, illustrating a second alternate configuration for write gap structure 44. In this example, write gap structure 44 includes a first linear (transverse) write gap 94 and a second chevron-shaped write gap 95 with vertex V' oriented along centerline L' of write gap structure 44, for example to generate pattern lines 84 and 85 for servo data pattern 60 of FIG. 5B.

As shown in FIG. 6B, end features 76 have a diamond-shaped configuration and chevron-shaped write gap 95 follows transverse write gap 94, with vertex (or cusp) V' oriented against or oppositely with respect to the travel direction of the magnetic medium. Alternatively, chevron write gap 95 may be reversed, with vertex V' oriented along the media travel direction, and complementary servo data patterns may be formed with either linear write gap 94 or chevron write gap 95 first, followed by chevron write gap 95 or linear write gap 94.

Figure 6C:
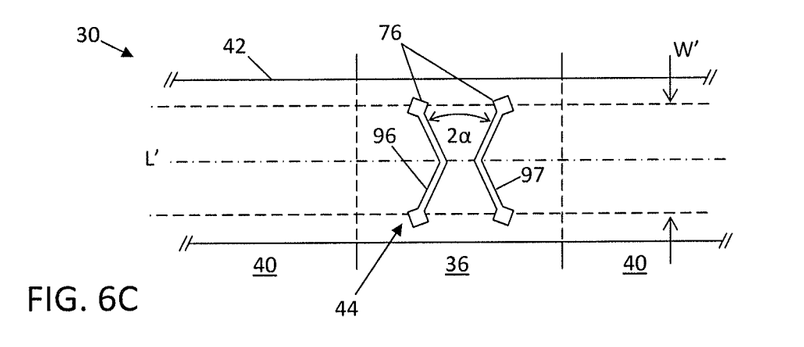
FIG. 6C is a front surface view of a third alternate thin film structure for the magnetic head.

FIG. 6C is a schematic view of write gap element 42 for magnetic head 30, illustrating a third alternate configuration for write gap structure 44. In this example, write gap structure 44 includes first and second chevron-shaped write gaps 96 and 97 forming skew angle 2α, with vertices V' oriented along centerline L' or write gap structure 44. Alternatively, chevron write gaps 96 and 97 may be reversed to generate a complementary servo data pattern 60, for example to form inward or outward-facing chevron pattern lines 86 and 87, as shown in servo data pattern 60 of FIG. 5C.

In each of the various examples, configuration and embodiments described here, the particular features of magnetic head 30, write gap structure 44 and servo data pattern 60 are merely representative. In particular, different combinations of these features are contemplated, for example using gap structures 44 with any two, three or more write gaps 73-75 and 92-97, in any order, in order to generate corresponding servo data patterns 60 with any combination of pattern lines 63-65 and 82-87. Any of the various end features 76 may also be used, and write gaps 73-75 and 92-97 may also take on other forms, for example with curved or arcuate segments configured to generate pattern lines 63-65 or 82-87 with corresponding curvature.

In the foregoing description, various embodiments of the invention have thus been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

The invention claimed is:

1. An assembly comprising:
   a plurality of laterally spaced front blocks;
   a magnetic post coupling each of the front blocks to a back bar;
   a front bar magnetically coupled to the back bar;
   a write gap spacer positioned between the front bar and each of the plurality of front blocks;
   a write gap element coupling the front bar to each front block across the write gap spacer, the write gap element comprising write gaps; and
   a coil configured to generate magnetic flux in each magnetic post, wherein the front blocks direct the magnetic flux across the write gaps of each write gap element.

2. The assembly of claim 1, further comprising a plurality of laterally spaced intermediate blocks positioned between the laterally spaced front blocks, wherein the intermediate blocks are magnetically coupled to the front bar and substantially decoupled from the back bar.

3. The assembly of claim 2, further comprising block spacers positioned between the plurality of laterally spaced front blocks and the plurality of laterally spaced intermediate blocks, wherein the block spacers substantially decouple each intermediate block from each coil.

4. A system comprising a magnetic medium positioned adjacent the assembly of claim 2.

5. The system of claim 4, wherein the plurality of laterally spaced front blocks define servo bands along the magnetic medium.

6. A magnetic medium having at least four servo bands written by the system of claim 5.

7. The magnetic medium of claim 6, wherein the intermediate blocks define at least three data bands extending between the servo bands.

8. The assembly of claim 1, wherein the write gap element comprises a plurality of at least two write gaps, the write gaps forming an angle of at least two degrees therebetween.

9. The assembly of claim 8, wherein the write gap element comprises a plurality of at least two parallel write gaps and one skew write gap, the skew write gap forming an angle of at least two degrees with respect to the two parallel write gaps.

10. The assembly of claim 1, further comprising end blocks spaced laterally from the plurality of front blocks along opposite lateral edges of the front and back bars, wherein the ends blocks are magnetically coupled to the front bar and substantially decoupled from the back bar.

11. A magnetic head comprising:
    a plurality of laterally spaced front blocks, wherein each of the laterally spaced front blocks is magnetically coupled to a write gap element having at least two write gaps;
    a plurality of vias coupling the plurality of laterally spaced front blocks to a back bar;
    a plurality of coils for generating magnetic flux in the vias, wherein the plurality of laterally spaced front blocks direct the flux from the vias across the write gap elements; and
    a front bar forming a return path for the magnetic flux, wherein the front bar couples each of the write gap elements to the back bar.

12. The magnetic head of claim 11, further comprising a gap spacer positioned between each laterally spaced front block and the front bar, wherein the write gap element forms a magnetic coupling across the gap spacer.

13. The magnetic head of claim 11, further comprising a plurality of laterally spaced shield blocks alternating with the laterally spaced front blocks.

14. The magnetic head of claim 13, further comprising spacers positioned between the laterally spaced front blocks and the shield blocks, wherein the spacers substantially decouple the shield blocks from the coils.

15. The magnetic head of claim 14, wherein the angle is between about five degrees and about seven degrees.

16. The magnetic head of claim 11, wherein each write gap element has at least two write gaps forming an angle of at least two degrees therebetween.

17. A system comprising:
a magnetic medium; and
a magnetic head facing the magnetic medium, the magnetic head comprising:
  a plurality of write gap elements spaced laterally across the magnetic medium, each of the write gap elements comprising at least two write gaps;
  a plurality of front blocks spaced laterally across the magnetic medium, each of the front blocks coupled to one of the write gap elements;
  each of the front blocks coupled to a corresponding via coupled to a back bar;
  each via coupled to a corresponding coil configured to generate magnetic flux; and
  a front bar coupling the back bar to each of the front blocks, wherein the front bar provides a return path for the magnetic flux from each via across each of the write gap elements to the back bar.

18. The system of claim 17, wherein each write gap element comprises at least two non-parallel write gaps configured to define servo patterns along the magnetic medium.

19. The system of claim 18, further comprising a plurality of intermediate shield blocks spaced laterally across the magnetic medium and alternating with the front blocks.

20. The system of claim 19, wherein the intermediate shield blocks define data bands extending along the magnetic medium between the servo patterns.

* * * * *

UNITED STATES PATENT AND TRADEMARK OFFICE
CERTIFICATE OF CORRECTION

| | | |
|---|---|---|
| PATENT NO. | : 8,797,681 B2 | Page 1 of 1 |
| APPLICATION NO. | : 13/795590 | |
| DATED | : August 5, 2014 | |
| INVENTOR(S) | : Stephen J. Rothermel | |

It is certified that error appears in the above-identified patent and that said Letters Patent is hereby corrected as shown below:

In the Specification

At Column 1, Line 23
"Ser. No. 13/79421,"

should read:
--Ser. No. 13/795,421,--

Signed and Sealed this
Twentieth Day of January, 2015

Michelle K. Lee
*Deputy Director of the United States Patent and Trademark Office*